No. 891,429.

PATENTED JUNE 23, 1908.

J. LUPPINO.

VEHICLE WHEEL.

APPLICATION FILED JUNE 10, 1907.

UNITED STATES PATENT OFFICE.

JOSEPH LUPPINO, OF NEW LONDON, CONNECTICUT.

VEHICLE-WHEEL.

No. 891,429.  Specification of Letters Patent.  Patented June 23, 1908.

Application filed June 10, 1907. Serial No. 378,179.

*To all whom it may concern:*

Be it known that I, JOSEPH LUPPINO, a subject of the King of Italy, residing at New London, in the county of New London and State of Connecticut, have invented a new and useful Improvement in Vehicle-Wheels; and I do hereby declare the following, when taken in connection with the accompanying drawings and the letters of reference marked thereon, to be a full, clear, and exact description of the same, and which said drawings constitute part of this specification, and represent, in—

Figure 1:
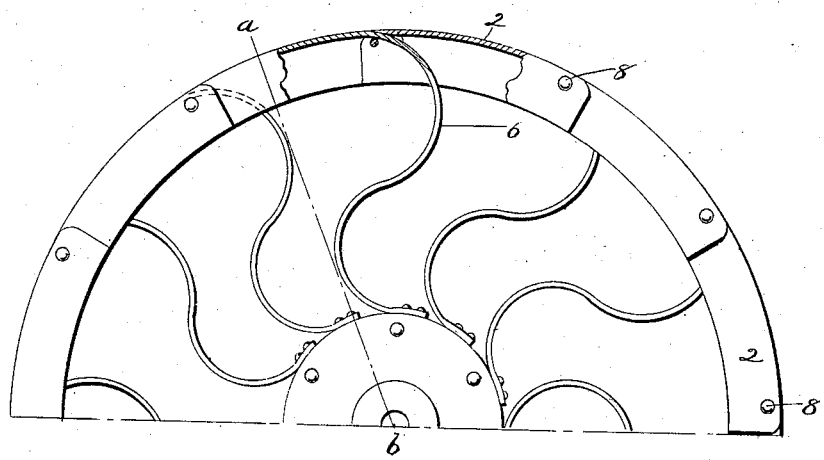
Figure 2:
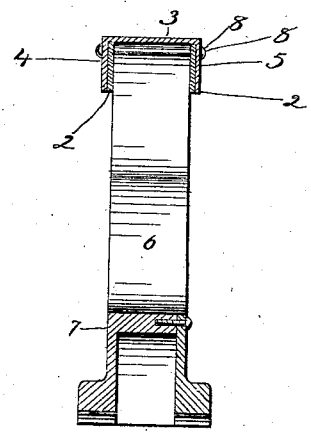

Figure 1 a side view partially in section of a portion of a vehicle wheel constructed in accordance with my invention. Fig. 2 a sectional view on the line $a$—$b$ of Fig. 1.

This invention relates to an improvement in vehicle wheels, and while adapted for various purposes, is particularly designed for motor vehicles, the object being to provide a wheel which will be sufficiently rigid to stand the necessary strain and yet having a yielding tread or rim so as to break the jolt or jar caused by uneven surfaces in the road, and absorb such jar in the wheel instead of transmitting it through the springs to the vehicle; and the invention consists in the construction hereinafter described and particularly recited in the claims.

In carrying out my invention I form the rim or tire of the wheel from a series of sections 2, more or less in number. These sections are formed from metal of inverted U shape in cross section, forming a tread 3 and sides 4 and 5. One end of each section of the tread is extended forming an S-shaped spring spoke 6 the inner end of which is secured to the hub 7. The sides 4, 5 at the forward end project beyond the point where the spoke merges into the tread, and these ends are slightly set outward. The rear ends of each section are slightly set inward so as to enter between the forwardly projecting ends of the next adjacent section, and these adjacent overlapping ends are connected together by rivets 8 so that the several sections of the rim are hinged together, thus permitting any portion of the rim to bend inward against the force of the spring spokes so as to adjust itself to any uneven places in the road.

It is apparent, without illustration, that the outer end of the spokes might be riveted to the rim or tire instead of being formed integral therewith.

I claim:—

1. The herein described wheel comprising a rim formed from a series of sections hinged together, said sections of U-shape, the tread portions extended forming integral spring spokes, substantially as described.

2. The herein described vehicle wheel comprising a rim formed from a series of sections hinged together, said sections of U shape, the tread portions extended forming integral S-shaped spring spokes, substantially as described.

3. The herein described wheel comprising a rim formed from a series of sections of U-shape in cross section forming a tread and sides, the tread extended forming integral spring spokes, the ends of adjacent sections overlapping each other and pivoted together, substantially as described.

4. The herein described wheel comprising a rim or tire formed from a series of sections hinged together, said sections of U-shape and opening inward, a hub, and spokes between the hub and rim.

In testimony whereof, I have signed this specification in the presence of two subscribing witnesses.

JOSEPH LUPPINO.

Witnesses:
F. X. DEBEAU,
ALBERT E. PAQUETTE.